United States Patent
Navratil et al.

(10) Patent No.: US 8,930,709 B2
(45) Date of Patent: Jan. 6, 2015

(54) METHOD AND APPARATUS FOR SEQUENTIAL AUTHENTICATION USING ONE OR MORE ERROR RATES CHARACTERIZING EACH SECURITY CHALLENGE

(75) Inventors: Jiri Navratil, White Plains, NY (US); Ryan L. Osborn, White Plains, NY (US); Jason W. Pelecanos, Ossining, NY (US); Ganesh N. Ramaswamy, Mohegan Lake, NY (US); Ran D. Zilca, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 12/057,470

(22) Filed: Mar. 28, 2008

(65) Prior Publication Data

US 2008/0222722 A1 Sep. 11, 2008

Related U.S. Application Data

(63) Continuation of application No. 11/159,722, filed on Jun. 23, 2005, now abandoned.

(51) Int. Cl.
*G06F 21/00* (2013.01)
*H04L 29/06* (2006.01)
*G06F 21/31* (2013.01)

(52) U.S. Cl.
CPC .... *H04L 63/0861* (2013.01); *G06F 2221/2103* (2013.01); *H04L 63/104* (2013.01); *G06F 21/31* (2013.01)
USPC .......................................................... 713/186

(58) Field of Classification Search
None
See application file for complete search history.

(56) References Cited

U.S. PATENT DOCUMENTS 6,529,871 B1   3/2003   Kanevsky et al.   ............ 704/246
6,591,224 B1 *  7/2003   Sullivan et al.   ................ 702/179

(Continued)

FOREIGN PATENT DOCUMENTS

JP   2000259278 A   9/2000
JP   2003162722 A   6/2003
JP   2004152045 A   5/2004

OTHER PUBLICATIONS

Duc et al. Person Authentication by Fusing Face and Speech Information AVBPA '97: Proceedings of the First International Conference on Audio- and Video-Based Biometric Person Authentication 1997 Springer-Verlag pp. 311-318.*

(Continued)

*Primary Examiner* — David Pearson
(74) *Attorney, Agent, or Firm* — Ryan, Mason & Lewis, LLP

(57) ABSTRACT

Methods and apparatus are provided for sequential authentication of a user that employ one or more error rates characterizing each security challenge. According to one aspect of the invention, a user is challenged with at least one knowledge challenge to obtain an intermediate authentication result; and the user challenges continue until a cumulative authentication result satisfies one or more criteria. The intermediate authentication result is based, for example, on one or more of false accept and false reject error probabilities for each knowledge challenge. A false accept error probability describes a probability of a different user answering the knowledge challenge correctly. A false reject error probability describes a probability of a genuine user not answering the knowledge challenge correctly. The false accept and false reject error probabilities can be adapted based on field data or known information about a given challenge.

22 Claims, 5 Drawing Sheets

(56) References Cited

U.S. PATENT DOCUMENTS

| | | | |
|---|---|---|---|
| 6,857,073 B2* | 2/2005 | French et al. | 713/168 |
| 6,879,968 B1* | 4/2005 | Hayakawa et al. | 706/20 |
| 7,086,085 B1* | 8/2006 | Brown et al. | 726/7 |
| 7,434,063 B2* | 10/2008 | Watanabe | 713/186 |
| 2001/0048025 A1* | 12/2001 | Shinn | 235/382 |
| 2002/0184538 A1* | 12/2002 | Sugimura et al. | 713/202 |
| 2003/0051147 A1* | 3/2003 | Maeda et al. | 713/186 |
| 2004/0049687 A1* | 3/2004 | Orsini et al. | 713/189 |
| 2004/0083394 A1* | 4/2004 | Brebner et al. | 713/202 |
| 2004/0088587 A1 | 5/2004 | Ramaswamy et al. | 713/202 |
| 2004/0153656 A1* | 8/2004 | Cluts et al. | 713/186 |
| 2004/0164139 A1 | 8/2004 | Hillhouse | |
| 2004/0164848 A1* | 8/2004 | Hwang et al. | 340/5.82 |
| 2004/0219902 A1* | 11/2004 | Lee et al. | 455/410 |
| 2005/0132235 A1* | 6/2005 | Teunen | 713/202 |

OTHER PUBLICATIONS

Guochen, L , "A Log Likelihood Ratio Test Based Feature Word Selection Approach in Text Categorization," Journal of Chinese Information Processing, vol. 13, No. 4, pp. 16.

* cited by examiner

FIG. 3

```
<VERIFICATION_OBJECT_BASE>

<OBJECT NAME="DOB"
       ENGINE="KNOWLEDGE"                 302
       TYPE="QA"
       PROMPT="WHAT IS YOUR DATE OF BIRTH?"
       PERPLEXITY="10"></OBJECT>

<OBJECT NAME="CALLER ID"
       ENGINE="TELEPHONY"                 304
       TYPE="CALLER_ID"
       PROMPT=NONE
       PERPLEXITY="20"></OBJECT>

<OBJECT NAME="VOICE_PRINT"
       ENGINE="VOICEPRINT"                306
       PROMPT=NONE
       PERPLEXITY="1000"></OBJECT>

<OBJECT NAME="COLOR"
       ENGINE="KNOWLEDGE"                 308
       TYPE="QA"
       PROMPT="WHAT IS YOUR FAVORITE COLOR?"
       PERPLEXITY="5"></OBJECT>

<OBJECT NAME="CAR_COLOR"               310
       INHERIT FROM="COLOR"
       PROMPT="WHAT IS THE COLOR OF YOUR CAR?"></OBJECT>

<OBJECT NAME="CUR_BALANCE"             312
       ENGINE="KNOWLEDGE"
       TYPE="APP_NUM"
       PROMPT="WHAT IS CURRENTLY THE APPROXIMATE BALANCE IN YOUR ACCOUNT?">
       PERPLEXITY="100"></OBJECT>

<OBJECT NAME="LAST_TRANSACTION_DATE"
       ENGINE="KNOWLEDGE"                 314
       TYPE="APP_STR"
       PROMPT="WHAT IS THE DATE OF YOUR LAST TRANSACTION?"
       PERPLEXITY="100"></OBJECT>

</VERIFICATION_OBJECT_BASE>
```

FIG. 4

```
                                                        ┌─400
<USER_MODEL NAME="JOHN_DOE">
   <OBJECTS>
      <OBJECT NAME="CALLER ID"
              ANSWER="914-945-3000"        ◄─402
              PREFERENCE="20"></OBJECT>
      <OBJECT NAME="DOB"
              ANSWER="08-02-1975"          ◄─404
              PREFERENCE="20"></OBJECT>
      <OBJECT NAME="COLOR"
              ANSWER="BLUE"                ◄─406
              PREFERENCE="10"></OBJECT>
      <OBJECT NAME="CAR_COLOR"
              ANSWER="RED"                 ◄─408
              ANSWER="BEIGE"
              PREFERENCE="30"></OBJECT>
      <OBJECT NAME="VOICE_PRINT"
              FILENAME="JOHN_DOE.VPR"      ◄─410
              PREFERENCE="30"></OBJECT>
      <OBJECT NAME="CUR_BALANCE"           ◄─412
              PREFERENCE="10"></OBJECT>
      <OBJECT NAME="LAST_TRANSACTION_DATE"  ◄─414
              PREFERENCE="10"></OBJECT>
   </OBJECTS>
</USER_MODEL>
```

METHOD AND APPARATUS FOR SEQUENTIAL AUTHENTICATION USING ONE OR MORE ERROR RATES CHARACTERIZING EACH SECURITY CHALLENGE

CROSS-REFERENCE TO RELATED APPLICATIONS

This application is a continuation of U.S. patent application Ser. No. 11/159,722 filed Jun. 23, 2005 and incorporated by reference herein.

FIELD OF THE INVENTION

The present invention is gene ally related to user authentication techniques and, more particularly, to techniques for providing sequential user authentication.

BACKGROUND OF THE INVENTION

Authenticating the identity claim of a user is an important step in ensuring the security of systems, networks, services and facilities, both for physical and for logical access. Existing user authentication is often performed on the basis of a user's knowledge of a single verification object, e.g., a password or a personal identification number (PIN) or on the basis of possession of a single verification object, e.g., a key or a card. Other existing authentication techniques include the use of a biometric feature as the verification object, e.g., a fingerprint, a voiceprint, an iris scan or a face scan.

Verification is typically done by comparing the verification object obtained from the user at the time of attempted access to previously stored objects. Biometric systems, for example, typically produce a similarity score measuring how close an input biometric is to a reference biometric template. A threshold is then applied to the score to make a binary decision about whether to accept or reject a given user. Possession-based user authentication systems make a binary accept/reject decision based on the presence of a physical device (e.g., a key) or a virtual device (e.g., a digital certificate). For knowledge verification, a single challenge will result in a binary decision based on the correctness of the user's response.

When multiple challenges are presented to the user for the purpose of authentication, user authentication is said to be sequential. Sequential user authentication may be accomplished by using a sequence of authentication challenges from the same mode (e.g., presenting only knowledge verification questions), or using multiple verification modes (e.g., presenting both random knowledge challenges and asking for one or more physical keys). Sequential authentication based on biometrics may be possible, depending on the type of biometric. For example, fingerprints are consistent and sequential challenges would not be beneficial since they capture the same identical fingerprint. The human voice, however, does change, and therefore sequential voice biometrics ("speaker recognition") is beneficial.

When sequential user authentication is utilized, the set of rules or algorithms for making a binary decision to accept or reject the user may be more complicated than a simple threshold, since the results from individual interaction turns (challenges) may be contradicting. A policy is the set of rules that specify, at each turn, whether to accept the user, reject the user, or present the user with a new challenge.

A number of techniques have been proposed or suggested for combining speaker recognition and knowledge verification using conversational biometrics with a policy that governs the user interaction based on both the measured biometric (speaker recognition) and knowledge responses. For example, U.S. patent application Ser. No. 10/283,729, filed Oct. 30, 3002, entitled "Methods and Apparatus for Dynamic User Authentication Using Customizable Context-Dependent Interaction Across Multiple Verification Objects," assigned to the assignee of the present invention and incorporated by reference herein, discloses an authentication framework that enables a dynamic user authentication that combines multiple authentication objects using a shared context and that permits customizable interaction design to suit varying user preferences and transaction/application requirements. See also, U.S. Pat. No. 6,529,871, entitled "A Way to Identify Using Both Voice Authentication and Personal Queries," assigned to the assignee of the present invention and incorporated by reference herein.

While such conversational biometric techniques provide improved authentication frameworks with a high degree of flexibility, accuracy, convenience and robustness, they suffer from a number of limitations, which if overcome, could further improve the efficiency and security of such user authentication techniques. In particular, the above-described techniques for conversational biometrics yield a binary decision for each challenge.

A need therefore exists for methods and apparatus for conversational biometrics that yield a continuous-value score for each challenge. The continuous-value score allows for fusing of multiple biometric systems prior to setting a security level. A further need exists for methods and apparatus that measure similarity scores from knowledge verification systems. Yet another need exists for methods and apparatus that manage a sequential authentication system based on measured knowledge scores

SUMMARY OF THE INVENTION

Generally, methods and apparatus are provided for sequential authentication of a user that employ one or more error rates characterizing each security challenge. According to one aspect of the invention, a user is challenged with at least one knowledge challenge to obtain an intermediate authentication result; and the user challenges continue until a cumulative authentication result satisfies one or more criteria. The intermediate authentication result is based, for example, on log likelihood ratio and the cumulative authentication result is, for example, a sum of individual log likelihood ratios.

The intermediate authentication result is based, for example, on one or more of false accept and false reject error probabilities for each knowledge challenge. A false accept error probability describes a probability of a different user answering the knowledge challenge correctly. A false reject error probability describes a probability of a genuine user not answering the knowledge challenge correctly.

According to another aspect of the invention, one or more of the false accept and false reject error probabilities are adapted based on field data or known information about a given challenge. For example, the FA and FR values may be changed by adapting to field data reflecting the measured FA and FR values. The FA and FR values may also be changed to reflect expected security breaches. The continuous scores provided by the present invention allow easier adaptation, as they imply a statistical model that has parameters, such as FA and FR. In addition, the continuous scores provided by the present invention allow one or more of the intermediate authentication results and the cumulative authentication result to be combined with a result from another verification method (such as biometric or possession based authentication).

A more complete understanding of the present invention, as well as further features and advantages of the present invention, will be obtained by reference to the following detailed description and drawings.

BRIEF DESCRIPTION OF THE DRAWINGS

FIG. 3 is a diagram illustrating an exemplary specification of multiple verification objects, according to one embodiment of the invention;

FIG. 4 is a diagram illustrating an exemplary specification of user models including multiple verification objects, according to one embodiment of the invention;

DETAILED DESCRIPTION OF PREFERRED EMBODIMENTS

Figure 1:
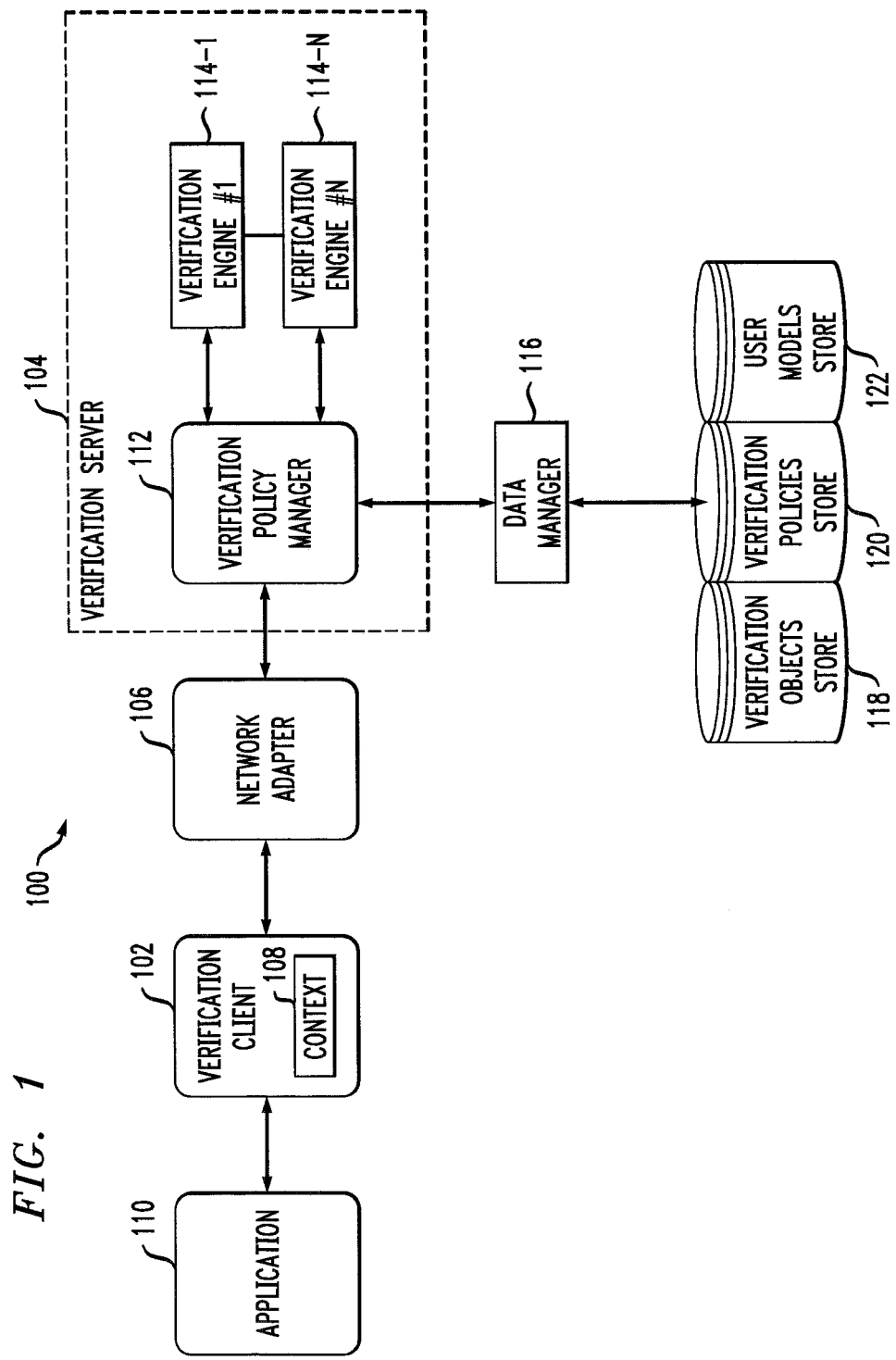
FIG. 1 is a block diagram illustrating a client-server architecture of an authentication system for implementing sequential authentication in accordance with the present invention.

The present invention provides a sequential authentication system. The disclosed sequential authentication system is based on knowledge verification for the purpose of measuring a similarity score for every interaction turn. The disclosed sequential authentication system continuously estimates the probability that the user's identity claim is genuine and the probability that the user is not who he or she claims to be.

During a user authentication, a series of challenges is presented to the user, and each user response is compared to one or more models, resulting in an intermediate authentication decision (such as a log likelihood ratio (LLR)). At each interaction turn, the intermediate decisions from the individual turns are combined (such as a sum of LLRs) to create a cumulative authentication result to ultimately either accept or reject the user's identity claim. The models used for the sequential authentication process may also be adapted from the user data during authentication, and may also be used in conjunction with voice biometric models performing speaker recognition (or another modality) to complete the user authentication task.

According to one aspect of the invention, the user or background models, or both, comprise False Accept (FA) and False Reject (FR) error rates that characterize each security challenge. The FA describes the probability of a different user answering correctly to the security challenge, and the FR describes the probability of the genuine user not answering correctly. The FA and FR assigned to each challenge may be only in the background model, thus assuming that all users have the same FA and FR, or in addition, user specific FA and FR may be assigned to each challenge and stored in the user model. As discussed below in conjunction with FIG. 4, the user model also includes the correct responses to the security challenges According to a further aspect of the invention, the FA and FR values may be changed by adapting to field data reflecting the measured FA and FR values. The FA and FR values may also be changed to reflect expected security breaches for example, in the case where a repository of social security numbers is stolen, the FA assigned to the social security number challenge will be updated to be higher than typically expected. The continuous scores provided by the present invention allow easier adaptation, as they imply a statistical model that has parameters, such as PA and FR.

The invention is illustrated using an exemplary client-server system architecture. It should be understood, however, that the invention is not limited to use with any particular system architecture. The invention is instead more generally applicable to any system architecture in which it is desirable to provide an authentication framework that provides a high degree of flexibility, accuracy, convenience and/or robustness. That is, the techniques of the present invention may be implemented on a single computer system or on multiple computer systems coupled by a suitable network, examples of which will be described below.

In one embodiment, the interaction design is based on authentication policies implemented as a statistical state machine using XML (eXtensible Markup Language). In addition, there is a file that specifies the relevant authentication objects (e.g., questions to be asked or actions to be performed) and files that contain user profiles (e.g., user selected authentication objects and correct responses and/or user preferences) both of which may also be implemented using XML.

The entire authentication interaction is determined dynamically based on the authentication policy in effect (selected based on user preferences and transaction or application requirements), using operations on the shared context, further utilizing the authentication objects in effect and the user profile of interest.

Such an approach provides significantly improved authentication capabilities as compared with existing authentication systems, and ensures a very high degree of accuracy, flexibility, convenience and robustness.

Furthermore, as will be illustratively explained in detail below, the authentication techniques of the present invention utilize the following components: (1) verification objects and verification engines; (2) verification policies and a verification policy manager; and (3) user models.

Verification objects are objects that can be used for the purpose of verifying the identity of users, such as the user's biometric characteristics (e.g., voiceprint, fingerprint, face scan, iris scan, handwritten signature and/or keyboard dynamics), the user's knowledge (e.g., passwords, passphrases, and/or answers to personal questions), and the user's possessions (e.g., keys, cards, tokens, certificates, cellular telephone or home telephone transmitting caller-id information, personal or handheld computer with client software and/or user's location). It is to be under stood that the lists of example objects above are not intended to be exhaustive and, further, that the invention is not intended to be limited to any particular objects.

Verification engines are used to match the verification objects with the representation stored in a user model. Examples of verification engines include a fingerprint recognition system to match the user's fingerprint, a conversational system to evaluate spoken answers to questions such as a voice response system, a conversational system such as a speech or voiceprint recognition system (that may include natural understanding techniques) to extract and recognize a user's spoken utterances (wherein the conversational system may also include a speech synthesis system for generating synthesized questions and prompts), a caller-id recognition system to extract and match the user's telephone number, a badge leader to scan the user's badge or card, a PIN confirmation system to confirm a user's PIN, a face recognition system to extract and match a user's face scan, an iris recognition system to extract and match a user's iris scan, a handwriting recognition system to recognize a user's handwriting, a keyboard dynamic recognizer to match a user's keyboard dynamics, as well as other modality-specific engines discussed herein and/or may otherwise be known. It is to be understood that since these types of engine are well-known, further descriptions of details of such engines are not necessary and therefore are not provided herein. Again, it is to be understood that the list of example engines above is not intended to be exhaustive and, further, that the invention is not intended to be limited to any particular verification engines.

While verification engines typically perform user verification by comparing user input to the user's model that was created when the user enrolled, the invention is not restricted to verification engines that require user enrollment Unsupervised verification engines, that do not require the user to enroll, may also be used. When unsupervised verification engines are used, a single user model may be employed, including the user attributes as measured by the verification engines. For example, the following verification engines can be used: acoustic accent recognition, language identification, and face features detection (e.g., color of eyes, glasses detection). In this case, none of the individual verification engines require user enrollment, and one user model is used, stating the user's speech accent spoken, language, color of eyes, and whether he/she wears glasses.

Thus, the invention realizes that, while individual verification engines can be used to perform simple verification steps that operate in a predefined static manner, a more general framework is necessary when multiple verification objects are used to perform dynamic user authentication, in order to achieve a greater degree of accuracy and flexibility. The present invention provides such an improved authentication framework.

To accomplish this and other goals, the present invention employs verification policies that govern the interaction between the user and the overall system, including the authentication system, and between the various verification engines Any number of verification policies could be written to satisfy a wide variety of user-specific, transaction-specific or application-specific authentication needs, including needs that change in real-time.

As will be seen, such verification policies are managed by a verification policy manager which uses operations on a common context shared across all verification objects to achieve maximum programmability of the authentication system.

User models are typically created when a user enrolls in the system, using the inputs provided by the user (e.g., samples of voice, samples of fingerprint, and/or answers to personal questions), or acquired through other means (such as details of past transactions, balance in most recent bill, serial number of a key or badge issued, and/or encryption key contained in a smartcard or a client software).

The user models may be updated in real-time when needed, such as when a new bill is issued and the balance changes or when more voice samples are available. An individual user model contains information regarding all verification objects relevant to that user; including any user preferences related to the verification objects (e.g., a user may prefer questions regarding colors rather than numbers). User models also preferably support nontrivial manipulations of the verification objects, such as asking the user to add the first and third digits of his social security number. Again, any of the above-mentioned examples are not intended to limit the invention.

Given the above general description of some of the principles and features of the present invention, illustrative embodiments of these principles and features will now be given in the context of the figures.

Referring initially to FIG. 1, a block diagram illustrates a client-server architecture of an authentication system for implementing sequential authentication, according to one embodiment of the invention. As shown, the authentication system 100 comprises a verification client device 102 and a verification server 104, coupled via a network adapter 106. The verification client 102 has context 108 and application 110 associated therewith. The verification server 104 comprises a verification policy manager 112 and a plurality of verification engines 114-1 through 114-N, where N can be any integer 2, 3, 4 . . . , and represents the number of verification object families or types that the particular implementation of the invention can support. The authentication system 100 further comprises a data manager 116, a verification objects store 118, a verification policies stole 120 and a user models stole 122. While the data manager 116 and data stores 118, 120 and 122 are shown outside of the verification server box, it is to be understood that they may be implemented on the verification server.

The verification client device 102 is responsible for interfacing with the user and collecting the inputs from the user, communicating with the verification server 104 through the network adapter 106, and communicating with the application 110. In one embodiment of the invention, the verification client device 102 is also responsible for acquiring and maintaining the context 108.

In an alternative embodiment, the context 108 may be stored on a central database (not shown), accessible by other components of the system 100. Such an implementation allows for a stateless operation between the verification client device 102 and the verification server 104, such that different servers could be used for different turns in the verification process, thereby providing protection against a particular server going down in the middle of a verification process, and also allowing for improved load balancing of the server resources.

The context 108 records all relevant variables for the verification process, such as: (1) the user name; (2) the current state in the verification policy that is in effect; (3) the history pertaining to the verification objects that have been invoked and the scores and outcomes associated with the invocations; (4) transaction-specific requirements (e.g., desired level of accuracy or nature of the transaction); (5) user-specific requirements (e.g., a user having a cold may prefer not to rely on voiceprint match); and (6) other physical and logical variables (e.g., type of network connection—remote or local, or quality of a voice channel).

The context 108 may also record other variables that represent verification scores from external verification sources (not shown). For example, a customer entering a bank may have done so after swiping his bank card at the entrance, and that information could be included in the context 108 as an external score and be used for subsequent authentication processes at the counter or at the automated teller machine.

The variables initially included in the context 108 are system default variables relevant to the verification objects and other known requirements at the time of the initial build. However, as additional verification objects are added to the system 100 or as new requirements are discovered, user-defined variables may be added to the context 108.

The network adapter 106 enables communication between the client device 102 and the verification server 104. The network adapter 106 implements network transport protocols, such as the standard Transmission Control Protocol (TCP)/Internet Protocol (IP) or the Secure Sockets Layer (SSL) protocol. It is to be understood that in an embodiment where the authentication system 100 is implemented on a single computer system, a network adapter is not required.

As shown, the verification server 104 comprises a verification policy manager 112 and a set of verification engines 114-1 through 114-N Each verification engine operates on a given verification object or a family (type) of verification objects. For example, a fingerprint verification engine may operate on a particular fingerprint or different types of fingerprints (e.g., thumbprint or index-fingerprint). Similarly, a knowledge verification engine may operate on different types of challenge-response questions.

The flexible architecture allows for easy addition of new verification engines and verification objects. Verification engines to be added could be of a new type or an existing type. For example, a face recognition engine could be added to a verification server that previously comprised voiceprint and fingerprint recognition engines, or a second voiceprint recognition engine (which could be from a different manufacturer, for example) could be added. Similarly, new verification objects could be added to new verification engines or existing verification engines (such as adding a new question to an existing knowledge verification engine).

The verification policy manager 112 interprets a verification policy for a given user model, and drives the entire authentication process. The policy manager 112 receives the current context 108 from the verification client device 102, operates on the context, incorporates updated status of current verification objects, and returns an updated context to the verification client device 102 along with the specification of the next step to be taken during the verification process.

The verification policy manager 112 can optionally be responsible for invoking states in a finite state machine, interpreting the conditions of the state machine and branching to the next state. The verification policy manager 112 is the entity that makes the final accept or reject decision for the authentication process, and in some cases may also make intermediate decisions if the current transaction requires such decisions, provided the verification policy in effect permits it.

The data manager 116 controls the external storage resources, including verification objects stoic 118, verification policies store 120 and user models store 122. These resources may be accessed directly by the verification server 104 (either by the verification policy manager 112 or by the individual verification engines 114-1 through 114-N). In an alternative embodiment, such resources may be accessed by the verification client device 102 and shipped to the verification server 104 though the network adapter 106.

The application 110 is the application for which user authentication is required prior to granting access. Example applications include banking applications, travel applications and e-mail applications. The application 110 is responsible for providing application-specific and transaction-specific information and requirements. It is to be understood that the invention is not limited to any particular application.

In one embodiment of the invention, the verification client device 102 communicates with the verification server 104 using an XML message interface.

Further, in alternative embodiments, it is to be understood that the components associated with the verification server may themselves communicate with one another over the network adapter 106. Thus, for example, one or more of the verification engines 114 may communicate with the verification policy manager 112 over the network adapter 106. A similar distributed arrangement may exist with respect to the verification policy manager 112 and the data manager 116, and with the data manager 116 and the data stores 118, 120 and 122. Thus, it is to be understood that the interconnectivity of components shown in FIG. 1 is intended to be illustrative and, therefore, other suitable interconnections may be implemented to provide the authentication functionality of the present invention.

Figure 2:
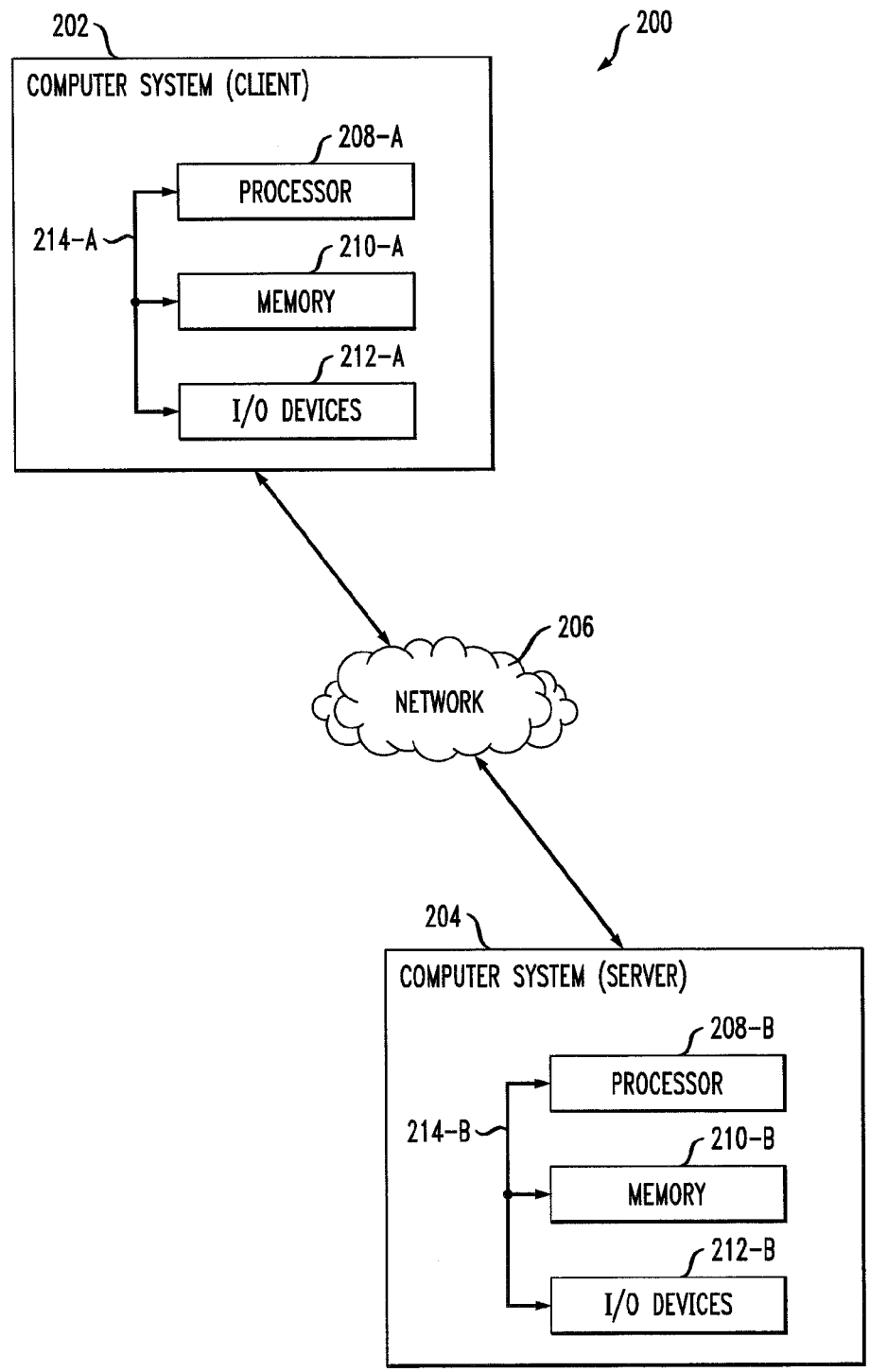
FIG. 2 is a block diagram illustrating an exemplary computing system environment for implementing sequential authentication in accordance with the present invention.

Referring now to FIG. 2, a block diagram illustrates an exemplary computing system environment for implementing sequential authentication, according to one embodiment of the invention. By way of example, the computing system 200 may represent at least a portion of a distributed computing system wherein a user communicates via a computer system 202 (referred to illustratively as a "client" or "client device") with another computer system 204 (referred to illustratively as a "server") via a network 206. The network may be any suitable network across which the computer systems can communicate, e.g., the Internet or Word Wide Web, or a local area network. However, the invention is not limited to any particular type of network in fact, it is to be understood that the computer systems may be directly linked without a network.

Further, while only two computer systems are shown for the sake of simplicity in FIG. 2, it is to be understood that the network may link a plurality of client devices and a plurality of servers. However, it is also to be appreciated that the techniques of the invention may be implemented on a single computer system wherein, for example, the user interacts directly with the computer system that performs the authentication operations.

With reference to FIG. 1, it is to be understood that the client device 102 may be implemented via computer system 202, and that the verification server 104 (and its components), the data manager 116 and the respective object, policy and user model stores (118, 120 and 122) may be implemented via the computer system 204. Network adapter 106 would therefore be implemented in accordance with network 206.

Thus, it is to be understood that FIG. 2 generally illustrates an exemplary architecture for each computer system communicating over the network. As shown, the computer system 202 comprises a processor 208-A, memory 210-A and I/O devices 212-A, all coupled via a computer bus 214-A. Similarly, the computer system 204 comprises a processor 208-B, memory 210-B and I/O devices 212-B, all coupled via a computer bus 214-B.

It should be understood that the term "processor" as used herein is intended to include one or more processing devices, including a central processing unit (CPU) or other processing circuitry. Also, the term "memory" as used herein is intended to include memory associated with a processor or CPU, such as RAM, ROM, a fixed, persistent memory device (e.g., hard drive), or a removable, persistent memory device (e.g., diskette or CD-ROM). In addition, the term "I/O devices" as used herein is intended to include one or more input devices (e.g., a keyboard or mouse) for inputting data to the processing unit, as well as one or more output devices (e.g., a display) for providing results associated with the processing unit. Further, the I/O devices associated with the computer system 202 are understood to include those devices necessary to collect the particular data associated with the verification objects supported by the authentication system, e.g., a microphone to capture voice data for voiceprint recognition and/or answers to questions posed, a speaker to output such questions to the user, a face scanner, an iris scanner, and/or a fingerprint scanner.

It is also to be understood that the client computer system illustrated in FIG. 2 may comprise a computer system programmed to implement the inventive techniques such as a personal computer, a personal digital assistant, or a cellular phone. Likewise, the server computer system illustrated in FIG. 2 may comprise a computer system programmed to implement the inventive techniques such as a personal computer, a microcomputer, or a minicomputer. However, the invention is not limited to any particular computer architecture.

Accordingly, software instructions or code for performing the methodologies of the invention, as described herein, may be stored in one or mole of the associated memory devices, e.g., ROM, fixed or removable memory, and, when ready to be utilized, loaded into RAM and executed by the CPU.

Referring now to FIG. 3, an example is shown of a registry of verification objects. In this particular embodiment, the registry 300 is represented using XML and stored in the verification objects store 118 (FIG. 1).

The specification contains a description of all registered verification objects, which can be updated as new verification objects are added. The first object (302) in this example is the Date-of-Birth (DOB) object, which is of the type Question-Answer (QA) and the verification engine responsible for operating on this object is the knowledge verification engine. A suggested prompt may also be included to prompt the user for the required response when this object in invoked, but the prompt may be modified or replaced by the verification client, if necessary. The "perplexityr" is a quantity that represents the difficulty associated with the verification object and may optionally be used by the verification policy manager in making verification decisions.

The second object (304) in this example is Caller-ID, which, in the case of a telephony connection, attempts to match the telephone number of the telephone originating the call with the telephone number in the relevant user model. No prompt is specified since this information may be obtained automatically from telephony infrastructure without any explicit input foam the user.

The third object (306) in this example is the Voiceprint object, and in this case no type is specified, since the voiceprint verification engine operates on one type of verification object. Given that voiceprints are a biometric feature that may not be stolen, a high perplexity is specified in this example.

The fourth and fifth objects (308 and 310) illustrate the hierarchical nature of the specification, whereby the CAR_COLOR object inherits default properties from the parent object COLOR.

The last two objects (312 and 314) in this example are examples of dynamic verification objects, whereby the intended response changes dynamically, and in this example, the correct responses are obtained from the application, rather than form the user model. The current balance (CUR_BALANCE) object (312) is an application-specific object of the type numeric (APP_NUM) and the last transaction date (LAST_TRANSACTION_DATE) object (314) is an application-specific object of the type string.

Referring now to FIG. 4, an example is shown of a user model. In this particular embodiment, the user model 400 is represented using XML and stored in the user models store 122 (FIG. 1).

The user model contains a description of verification objects for which the user has provided enrollment data. The first object (402) is the Caller-ID object, for which this user's correct response is 914-945-3000 in this example. The user's preference for this object may be optionally included and used by the verification policy in selecting objects with higher preference when possible.

The second and third objects (DOB 404 and COLOR 406) are similar. The fourth object (color of car or CAR_COLOR 408) has two responses in this example, since this user has two cats and either response may be accepted as the correct answer. The fifth object (410) is the voiceprint object, for which model parameters are needed, which may be stored in a file, and the filename is included. The last two objects (CUR_BALANCE 412 and LAST_TRANSACTION_DATE 414) do not have any correct responses included because they awe dynamic verification objects, and the current correct responses have to be obtained from the application.

As mentioned above, in accordance with the present invention, any of the objects can be updated or deleted in real-time, and new objects can be added in real-time.

As shown in FIG. 4, a user model in accordance with the present invention comprises False Accept (FA) and False Reject (FR) error rates that characterize each security challenge. The FA describes the probability of a different user answering correctly to the security challenge, and the FR the probability of the genuine user not answering correctly. The FA and FR assigned to each challenge may be only in the background model, thus assuming that all users have the same FA and FR, or in addition, user specific FA and FR values may be assigned to each challenge. For example, a particular challenge may have an FA value of 0.001 and an FR value of 0.07.

A lower FA rate in the user model 400 may reflect, for example, that the user easily gives out the answer to the challenge. Likewise, a lower FA fate in the background model 540 for a social security number challenge may reflect, for example, that a repository of social security numbers has been stolen A lower FR rate in the user model 400 may reflect, for example, that the user often forgets the answer to a particular challenge. Likewise, a lower FR late in the background model 540 for a particular challenge may reflect, for example, that a number of user's tend to forget the answer to the challenge.

The user model also includes the correct responses to the security challenges, as shown in FIG. 4. The FA and FR values may be changed by adapting to field data reflecting the measured FA and FR in practice. For example, if a number of users tend to forget the answer to the challenge, the FR value should be increased. The FA and FR values may also be changed to reflect expected security breaches. For example, in the case where a repository of social security numbers is stolen, the FA assigned to the social security number challenge will be updated to be higher than typically expected.

Figure 5:
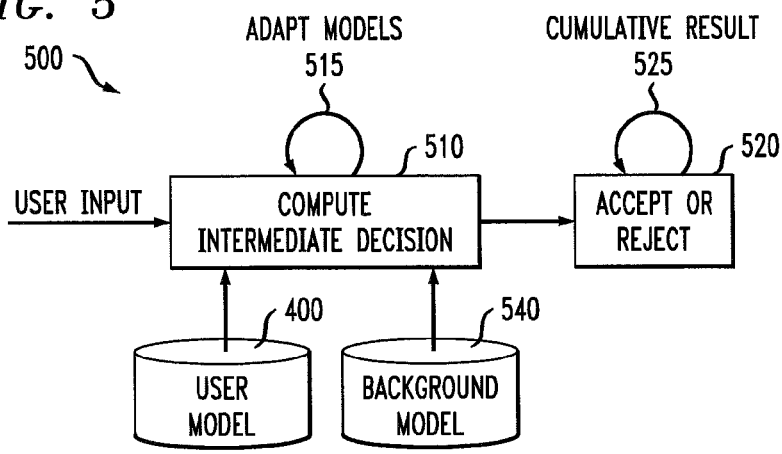
FIG. 5 is a block diagram illustrating a sequential authentication system incorporating features of the present invention.

FIG. 5 is a block diagram illustrating a sequential authentication system 500 incorporating features of the present invention. As shown in FIG. 5, the sequential authentication system 500 employs a user model 400 to describe the expected behavior of each user. In addition, the sequential authentication system 500 optionally employs a background model 540 that describes the expected behavior of the general population of users. The background model 540 may be, for example, a collection of individual user models 400.

The user model 400 and background model 540 may be created using any known technique, as would be apparent to a person of ordinary skill. For example, the user model 400 and background model 540 may be created using statistical generative models, such as Gaussian Mixture Models (GMM) and Hidden Markov Models (HMM). In addition, discriminative models, such as Artificial Neural Networks (ANN) and Support Vector Machines (SVM) may also be used. It is noted that while the user model 400 includes an FR late for each challenge, and optionally an FA late, the background model 540 includes an TA late for each challenge, and optionally an FR rate.

As previously indicated, at each interaction turn, a security challenge is presented to a user. The challenge is typically a question that the user must answer. Upon completion of each turn, an intermediate decision is computed at stage 510 using the background model 540 and user authentication model 400. The intermediate decision generated at stage 510 is then passed to a module 520 that aggregates the intermediate results to form a cumulative result 525 by which a user accept/reject decision is made. If a final decision cannot be made, the module 520 produces a third state cumulative result ("undecided"), meaning that additional challenges need to be presented to the user Optionally, the user and/or background model may be adapted at stage 515 to reflect the new user input.

In one embodiment, a Log Likelihood Ratio (LLR) score is computed for each interaction turn (forming an intermediate result) and is summed over turns (to form a cumulative user accept/reject result 525). The sum of the LLR scores can be compared to two thresholds to make a decision, for example, based on the Wald SPRT theory. See, for example, A. Wald, "Sequential Analysis," (J. Wiley, 1947).

If the LLR score exceeds the high threshold, then the user is accepted. If the cumulative LLR score does not meet the low threshold, the user is rejected, and if the LLR score is between the two thresholds, the interaction continues Assuming a global FA and FR for each challenge (stored in the background model 540), the LLR scores may be computed as follows:

For a given challenge i, two parameters are defined that characterize the challenge:

$p_i$ is the false accept (FA) late for the challenge (e.g., the probability of guessing the answer or having the answer compromised); and $q_i$ is the false rejection (FR) rate for the challenge (e.g., the probability of for getting the answer or not knowing)

The observation for the entire dialog may be represented by a binary vector x where every bit in x is either 1 for a correct answer or 0 for an incorrect answer for a particular challenge.

Defining $\lambda$ to be the case where the speaker claim is true, and $\bar{\lambda}$ the complementary case where the speaker is attempting to break into another account (i.e., an "imposter", the following probabilities can be computed for turn number j:

$$P(x_j \mid \lambda) = \begin{cases} q_i, & x_j = 0 \\ 1 - q_i, & x_j = 1 \end{cases}$$

$$P(x_j \mid \bar{\lambda}) = \begin{cases} 1 - p_i, & x_j = 0 \\ p_i, & x_j = 1 \end{cases}$$

and the LLR for each turn is:

$$LLR(j) = \log\left(\frac{P(x_j \mid \lambda)}{P(x_j \mid \bar{\lambda})}\right)$$

Now, assuming that the turns are independent (which could mean in practice that multi-field turns such as date-of-birth should be treated like a single turn), then after turn number N, the Log Likelihood Ratio (LILR) is calculated as:

$$LLR(N) = \log\left[\frac{P(x_1, x_2, \ldots, x_N \mid \lambda)}{P(x_1, x_2, \ldots, x_N \mid \bar{\lambda})}\right] = \sum_{j=1}^{N} \log\left[\frac{P(x_j \mid \lambda)}{P(x_j \mid \bar{\lambda})}\right] = \sum_{j=1}^{N} LLR(j)$$

The value of the LLR therefore increases with the number of turns, and since it is a sum, the distribution of this sum becomes mote Gaussian-like assuming independent turn based LLR estimates.

A straightforward combination of a biometric and knowledge-based system would be to add or average the two scores. The knowledge biometric score may be the score returned from the speaker verification engine (which is an estimate of the biometric LLR), or a probabilistic interpretation of this score. The thresholds are then applied to the combined score 525

Figure 6:
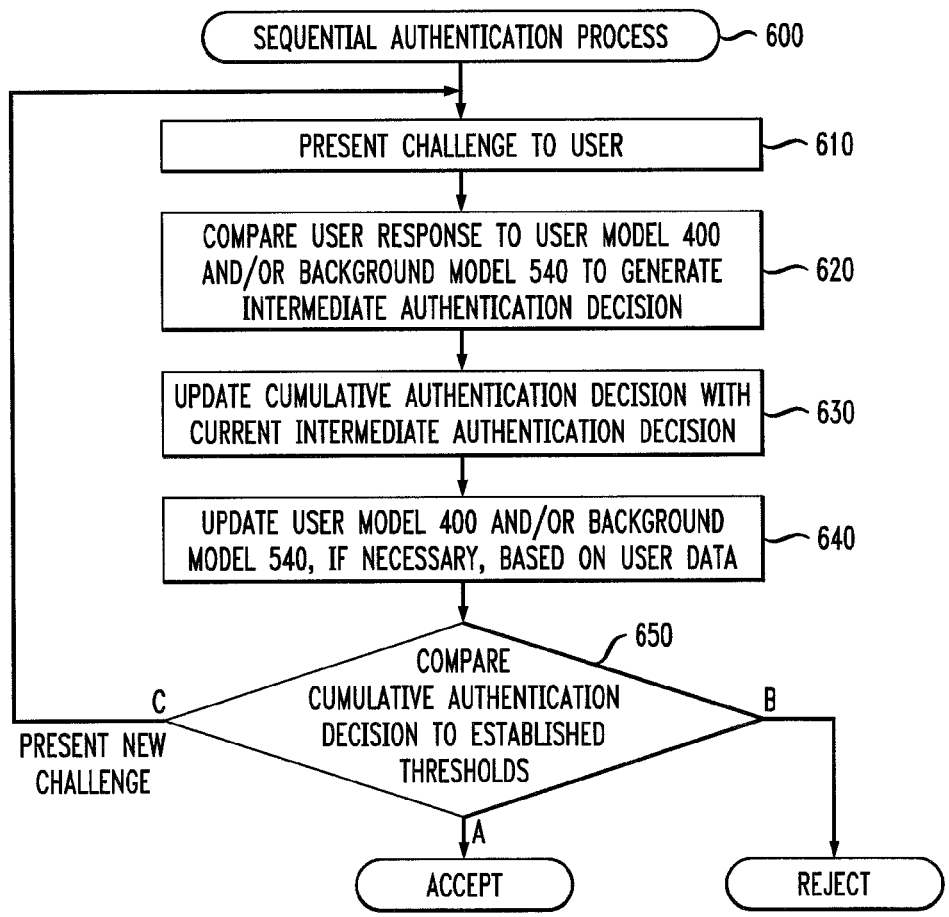
FIG. 6 is a flow chart describing an exemplary implementation of a sequential authentication process incorporating features of the present invention.

FIG. 6 is a flow chart describing an exemplary implementation of a sequential authentication process 600 incorporating features of the present invention. As shown in FIG. 6, the sequential authentication process 600 initially presents a challenge to the user during step 610. The user response is then compared to the user model 400 and/or background model 540 during step 620 to generate an intermediate authentication decision. The Log Likelihood Ratio (LLR) score may be computed for each interaction turn as follows:

$$LLR(j) = \log\left(\frac{P(x_j \mid \lambda)}{P(x_j \mid \bar{\lambda})}\right)$$

The cumulative authentication decision 525 is then updated during step 630 by adding to the current intermediate authentication decision (e.g., an LLR value) to the sum of LLR values. In addition, the user model 400 and/or background model 540 are updated, if necessary, during step 640 based on the user data. For example, the FA and FR values may be changed during step 640 by adapting to field data reflecting the measured FA and FR values. The FA and FR values may also be changed to reflect expected security breaches. For example, in the case where a repository of social security numbers is stolen, the FA assigned to the social security number challenge will be updated to be higher than typically expected.

Finally, a test is performed during step 650 to evaluate the cumulative authentication decision (sum of the LLR scores) 525 to the established thresholds. In one exemplary implementation, the sum of the LLR scores can be compared to two thresholds to make a decision. It the LLR score exceeds the high threshold, then the user is accepted (Branch A from step 650). It the cumulative LLR score does not meet the low threshold, the user is rejected (Branch B from step 650), and if the LLR score is between the two thresholds the interaction continues (Branch C from step 650).

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

What is claimed is:

1. A method for sequential authentication of a user, comprising:
    challenging said user with at least one knowledge challenge to obtain an intermediate authentication result, wherein said intermediate authentication result is based on one or more of false accept and false reject error probabilities for each knowledge challenge, wherein said false accept and false reject error probabilities for a current challenge are updated based on information from one or more previous challenges from one or more previous sessions prior to determining a final authentication result for said current challenge; and
    repeating said step of challenging said user with at least one knowledge challenge until a cumulative authentication result satisfies one or more criteria, wherein said cumulative authentication result is calculated based on a dynamic algorithm and wherein said dynamic algorithm is capable of being reconfigured during execution of said method, wherein one or more of said steps are performed by a processor.

2. The method of claim 1, wherein said false accept error probability describes a probability of a different user answering said knowledge challenge correctly.

3. The method of claim 1, wherein said false reject error probability describes a probability of a genuine user not answering said knowledge challenge correctly.

4. The method of claim 1, wherein one or more of said false accept and false reject error probabilities are defined for a population of users.

5. The method of claim 1, wherein one or more of said false accept and false reject error probabilities are defined for said user.

6. The method of claim 1, wherein one or more of said false accept and false reject error probabilities are adapted based on field data.

7. The method of claim 1, wherein one or more of said false accept and false reject error probabilities are adapted based on known information about a given challenge.

8. The method of claim 1, wherein said intermediate authentication result is a continuous score.

9. The method of claim 1, wherein said intermediate authentication result is based on log likelihood ratio.

10. The method of claim 1, wherein said cumulative authentication result is a sum of individual log likelihood ratios.

11. The method of claim 1, wherein one or more of said intermediate authentication results and said cumulative authentication result are combined with a result from a biometric verification method.

12. The method of claim 1, wherein one or more of said intermediate authentication results and said cumulative authentication result are combined with a result from a speaker verification method.

13. The method of claim 1, wherein said false accept and false reject error probabilities incorporate a likelihood of one or more of a speech recognition error and an automatic speaker recognition error.

14. A system for sequential authentication of a user, the system comprising:
    a memory; and
    at least one processor, coupled to the memory, operative to:
    challenge said user with at least one knowledge challenge to obtain an intermediate authentication result, wherein said intermediate authentication result is based on one or more of false accept and false reject error probabilities for each knowledge challenge, wherein said false accept and false reject error probabilities for a current challenge are updated based on information from one or more previous challenges from one or more previous sessions prior to determining a final authentication result for said current challenge; and
    repeating said challenge until a cumulative authentication result satisfies one or more criteria, wherein said cumulative authentication result is calculated based on a dynamic algorithm and wherein said dynamic algorithm is capable of being reconfigured during execution of said method, wherein one or more of said steps are performed by a processor.

15. The system of claim 14, wherein said false accept error probability describes a probability of a different user answering said knowledge challenge correctly and said false reject error probability describes a probability of a genuine user not answering said knowledge challenge correctly.

16. The system of claim 14, wherein one or more of said false accept and false reject error probabilities are defined for a population of users.

17. The system of claim 14, wherein one or more of said false accept and false reject error probabilities are defined for said user.

18. The system of claim 14, wherein one or more of said false accept and false reject error probabilities are adapted based on field data or known information about a given challenge.

19. The system of claim 14, wherein said intermediate authentication result is based on log likelihood ratio and said cumulative authentication result is a sum of individual log likelihood ratios.

20. The system of claim 14, wherein one or more of said intermediate authentication results and said cumulative authentication result are combined with one or more of a result from a biometric verification method and a result from a speaker verification method.

21. The system of claim 14, wherein said false accept and false reject error probabilities incorporate a likelihood of one or more of a speech recognition error and an automatic speaker recognition error.

22. An article of manufacture for sequential authentication of a user, comprising a machine readable recordable medium containing one or more programs which when executed implement the steps of:

challenging said user with at least one knowledge challenge to obtain an intermediate authentication result, wherein false accept and false reject error probabilities for a current challenge are updated based on information from one or more previous knowledge challenges from one or more previous sessions prior to determining a final authentication result for said current challenge; and repeating said step of challenging said user with at least one knowledge challenge until a cumulative authentication result satisfies one or more criteria, wherein said cumulative authentication result is calculated based on a dynamic algorithm and wherein said dynamic algorithm is capable of being reconfigured during execution of said method, wherein one or more of said steps are performed by a processor.

\* \* \* \* \*